(12) United States Patent
Pedersen et al.

(10) Patent No.: US 10,753,795 B2
(45) Date of Patent: Aug. 25, 2020

(54) INFRARED UPCONVERSION SPECTROMETER FOR THE MID-IR RANGE

(71) Applicant: Danmarks Tekniske Universitet, Kgs. Lyngby (DK)

(72) Inventors: Christian Pedersen, Valby (DK); Peter Tidemand-Lichtenberg, Hørsholm (DK); Jeppe Seidelin Dam, Kgs. Lyngby (DK); Lasse Høgstedt, Hillerød (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 66 days.

(21) Appl. No.: 16/316,241

(22) PCT Filed: Jul. 7, 2017

(86) PCT No.: PCT/EP2017/067053
§ 371 (c)(1),
(2) Date: Jan. 8, 2019

(87) PCT Pub. No.: WO2018/007572
PCT Pub. Date: Jan. 11, 2018

(65) Prior Publication Data
US 2019/0242747 A1  Aug. 8, 2019

(30) Foreign Application Priority Data

Jul. 8, 2016 (EP) .................................. 16178696

(51) Int. Cl.
*G01J 3/18* (2006.01)
*G01J 3/10* (2006.01)
(Continued)

(52) U.S. Cl.
CPC ............ *G01J 3/108* (2013.01); *G01J 3/0208* (2013.01); *G01J 3/0245* (2013.01); *G01J 3/18* (2013.01); *G01J 3/2803* (2013.01); *G01J 3/2823* (2013.01)

(58) Field of Classification Search
CPC combination set(s) only.
See application file for complete search history.

(56) References Cited

U.S. PATENT DOCUMENTS

| 4,980,566 A | 12/1990 | Heilweil |
| 7,696,479 B2 | 4/2010 | Decamp et al. |
| 2007/0152154 A1 | 7/2007 | Decamp et al. |

FOREIGN PATENT DOCUMENTS

| WO | WO 97/28437 A1 | 8/1997 |
| WO | WO 2015/003721 A1 | 1/2015 |

OTHER PUBLICATIONS

Dam, Jeppe Seidelin, "High resolution mid-infrared spectroscopy based on frequency upconversion", SPIE LASE,2013 (Year: 2013).*
(Continued)

*Primary Examiner* — Maurice C Smith
(74) *Attorney, Agent, or Firm* — Knobbe Martens Olson & Bear LLP

(57) ABSTRACT

The invention provides an infrared upconversion spectrometer for determining a mid-IR spectrum of received infrared light with a high resolution. The spectrometer applies upconversion to transform light in the mid-IR to the near-IR range where efficient detectors are available. The up-conversion causes divergence of the light, and in addition, the invention applies an extra dispersive element to record a spectrum.

9 Claims, 11 Drawing Sheets

(51) Int. Cl.
  *G01J 3/28*   (2006.01)
  *G01J 3/02*   (2006.01)

(56) References Cited

OTHER PUBLICATIONS

Thomas R. Gurski, "Upconversion of broadband infrared spectra", Apr. 15, 1978 (Year: 1978).*
Todd Johnson, "Mid-IR frequency comb upconversion spectroscopy", 2010 (Year: 2010).*
Dam, Jeppe Seidelin et al., "Room-temperature mid-infrared single-photon spectral imaging" Nature Photonics, Sep. 2012, pp. 1-6.
Decamp, Matthew F. et al., "Upconversion multichannel infrared spectrometer" Optics Letters, Jul. 2005, pp. 1818-1820, vol. 30, No. 14.
Hu, Qi et al., "High resolution mid-IR spectrometer based on frequency up-conversion" Optics Letters, 2012, pp. 5232-5234, vol. 37, No. 24.
International Search Report for PCT/EP2017/067053 dated Oct. 20, 2017.

* cited by examiner

INFRARED UPCONVERSION SPECTROMETER FOR THE MID-IR RANGE

CROSS REFERENCE TO RELATED APPLICATIONS

This application is a U.S. National Phase Application of PCT International Application Number PCT/EP2017/067053, filed on Jul. 7, 2017, designating the United States of America and published in the English language, which is an International Application of and claims the benefit of priority to European Patent Application No. 16178696.7, filed on Jul. 8, 2016. The disclosures of the above-referenced applications are hereby expressly incorporated by reference in their entireties.

FIELD OF THE INVENTION

The present invention relates to spectral analysis of infrared electromagnetic radiation. More specifically, the invention relates to an infrared upconversion spectrometer and a dispersive element.

BACKGROUND OF THE INVENTION

Low-noise detection of infrared radiation in the mid-IR range is challenging due to the thermal background radiation. The most widely used infrared spectrometer is the Fourier Transform Infrared (FTIR) spectrometer. Common FTIR spectrometers must scan a reference mirror with very high precision on a centimetre scale, requiring an extremely high precision mechanical system, with associated high costs, non-instantaneous measurements and generally a low tolerance for vibrations. Furthermore, detection of the radiation is commonly performed with mid-IR detectors.

It has been shown in "Room-temperature mid-infrared single-photon spectral imaging" (Jeppe Seidelin Dam, et al., Nature Photonics 6, pp. 788-793, 2012) how the angular dependent (non-collinear) phase-matching can be used to upconvert different spectral components in different angular directions. This, however, also implies that the upconverted light becomes a substantially concentric pattern with radii as a function of wavelength, i.e. each constituent frequency will emerge with a different angle, thus producing an effect similar to dispersion in a prism or diffraction by a grating. In the above reference, this is actively used as an approach to spectroscopy by detecting the upconverted light in the Fourier plane. The spectral resolution in this angular wavelength dependence is, however, relatively low, which inflicts on the resolution of the spectral measurements.

A mid-IR spectral measurement based on frequency upconversion was described in "High-resolution mid-IR spectrometer based on frequency upconversion", Qi Hu, et al., Optics Letters, 37(24), pp. 5232-5234, 2012. Upconversion spectral measurements are based on shifting the spectrum from the mid-IR region to the near visible spectral region where detectors are better developed and there are less thermal noise. The frequency shift is obtained by sum frequency mixing with a laser, resulting in a simple shift of the frequency while maintaining the spectral content for subsequent detection. In this reference, a wavelength range from about 2.89 µm-3.00 µm was up-converted using three different temperatures of the nonlinear crystal to phase-match different wavelength ranges. A drawback of temperature tuning the nonlinear crystal is that slow temperature changes must be used to avoid damage to coatings on end faces of the nonlinear crystal. Thus, acquisition time of a full spectrum in the described spectral measurement will be on the order of minutes. The temperature tuning will typically also change the laser cavity performance in an intracavity setup and degrade the mixing laser field due to thermal expansion of the nonlinear crystal. Furthermore, a relatively narrow wavelength range was detected.

WO 2015/003721 discloses a multichannel infrared upconversion spectrometer with several channels, each channel configured to upconvert different wavelength ranges. By using two or more up-conversion channels, an extended input wavelength range may be accepted and converted for detection. The present solution is different in several ways. Firstly, it is able to cover a much larger spectral range in a single channel, eliminating the need for use of multiple channels. Secondly, here we place the detector array in an image space relative to the non-linear crystal, whereas that work is based on placing the detector in a Fourier plane and analysing the ring patterns, relying on the dispersion (phase match condition) of the non-linear crystal to resolve the spectral information.

U.S. Pat. No. 4,980,566 describes an ultrafast time-resolved spectrometer. Here, an IR pico/femtosecond pulse having interacted with a sample is overlapped with another pulse inside a nonlinear crystal to upconvert the IR pulse. Although a long crystal is used, the pulses and the arrangement are optimised to achieve a short (<1 mm) collinear phase matching. The upconverted IR pulse then enters a traditional spectrograph via an entrance slit.

SUMMARY OF THE INVENTION

It is an object of the present invention to provide a high resolution spectrometer for the mid-IR range with no or few mechanically moving parts and no or less stringent requirements on cooling.

Therefore, in a first aspect, the invention provides an infrared upconversion spectrometer for determining a mid-IR spectrum of received infrared light, wherein the spectrometer comprises:
  a nonlinear material and first optical element arranged to couple the received infrared light into the nonlinear material;
  a laser arranged to couple into the nonlinear material in at least substantially the same direction of propagation as, and in spatial overlap with, in-coupled infrared light;
where the nonlinear material, the first optical element, and the laser are configured for non-collinear phase-matching in-coupled mid-IR light and upconverted light to be transmitted by the nonlinear material; and a spatially resolved detector with multiple pixels being sensitive to upconverted light;
the infrared upconversion spectrometer being characterized in that it further comprises:
  imaging optics arranged between the nonlinear material and the detector to image the spatial overlap between the laser light and the in-coupled infrared light inside the nonlinear material onto the detector; and
  a dispersive element, preferably a diffraction grating, arranged to disperse upconverted light such that different wavelength sub-ranges of the upconverted light are imaged onto different pixels of the detector;
and in that a spectral resolution of the spectrometer is determined by the laser, the dispersive element and a virtual slit being a spatial overlap between the laser light and the in-coupled infrared light inside the nonlinear material.

The Mid-IR spectrum is commonly as well as in the present invention associated with the wavelength range of 2-25 µm.

In the context of the present invention, in-coupled radiation refers to the part of the incoming radiation that propagates in the nonlinear material.

In the description of the invention, reference is often made to the orientations and sizes of beams and elements. In this respect, the coordinate system shown in FIG. 1B is used, where the received infrared light 1, the laser beam 9, and the upconverted light 13 propagates in a direction at least substantially parallel to the Z-axis.

Up-conversion is in the context of this text to be understood as the nonlinear optical process of sum frequency generation (SFG) for converting light to a higher frequency, i.e. shorter wavelength. Upconverted light or radiation refers to the light resulting from the SFG between the incoupled infrared light and the laser light.

Phase-matching should in the context of this document be understood as either true phase-matching or quasi phase-matching, e.g. as obtainable through poling or orientation patterning. The invention uses angular dependent (non-collinear) phase-matching in the upconversion, this is advantageous since it allows for both a broader spectral range to be upconverted (and detected, i.e. more spectral information) and for a larger angular range to be upconverted (using more received light, i.e. better SNR). The upconverted light has a concentric pattern with radii as a function of wavelength, i.e. each constituent frequency will emerge with a different angle, i.e. a dispersive effect. The wavelengths of the incoupled infrared light that is upconverted preferably lies in a first wavelength range in the mid-IR spectrum. The upconverted light lies in a second wavelength range with shorter wavelengths.

The skilled person will realize that a wide range of nonlinear materials are suitable for use in the infrared spectrometer. Selection criteria include the nonlinear coefficient at the respective wavelengths, the absorption, and the obtainable phase-matching properties.

In the context of the present invention, "imaging the . . . A . . . onto . . . B" means that A lies in the object plane of some imaging optics and B lies in the image plane. The imaging optics might include cylindrical elements or elements with different focal length along different axes, so that A is only imaged along one transverse direction.

The dispersive element is an element that spreads the light into its different wavelength constituents. Consider a collimated beam of light propagating in along the Z-axis, then the dispersive element is such that it spreads the beam out in its wavelength constituents in the X-Z plane, with the Y-axis being normal to this plane. In a preferred embodiment, the dispersive element is a diffraction grating such as a reflection or transmission grating, with its grating lines aligned parallel to the Y-axis. In alternative embodiments, the dispersive element is a prism or a holographic element, also oriented so that it spreads the light in the X-Z plane. In the remainder of the application, the dispersive element is mostly referred to as a grating, since the orientation of a grating and the plane into which it spreads a beam is clear and concise by referral to the grating lines. However, the other dispersive elements mentioned above may be substituted with a corresponding orientation. The dispersion element is preferably placed in a infinity corrected plane (in some circumstances also referred to as a Fourier plane) of the imaging optics. The dispersive element may form part of the imaging optics, e.g. a reflective grating can be shaped like a concave (cylindrical) mirror.

As the upconverted radiation is diffracted, the radiation incident on a pixel of the spatially resolved detector will correspond to only a part of the second wavelength range of the upconverted radiation, this is the wavelength sub-range.

In the following, a number of preferred and/or optional features, elements, examples and implementations will be summarized. Features or elements described in relation to one embodiment or aspect may be combined with or applied to the other embodiments or aspects where applicable. For example, structural and functional features applied in relation to the spectrometer may also be used as features in relation to the method and vice versa. Also, explanations of underlying mechanisms of the invention as realized by the inventors are presented for explanatory purposes, and should not be used in ex post facto analysis for deducing the invention.

With a spherical first optical element, the nonlinear optical process produces upconverted radiation in a ring pattern with varying radii as a function of wavelength. In upconversion spectral measurements until now, this ring pattern has been recorded and analysed by means of a 2-dimensional detector, typically a CCD camera.

In the present invention, this ring pattern is dispersed by the dispersive element, such as a grating with lines along the Y-axis). Thereby, the rings becomes displaced in the x-direction with an amount proportional to the wavelength of each ring.

In a preferred embodiment, the dispersed radiation is focused by a spherical lens or mirror, and each ring collapses into a point with a position depending on its wavelength. In such a design, the ring pattern of the upconverted light becomes a line of points and the detector is preferably a line-detector. The application of a line-detector will have several beneficial aspects in connection to mid-IR upconversion spectroscopy (here listed in no particular order):

Line detectors (one dimensional detector array) are commonly available at telecommunications wavelengths: 1.5 µm whereas 2D cameras at 1.5 µm is prohibitly expensive for many industrial applications. Line arrays allow us to build upconversion devices where the upconverted light ends up at 1.5 µm rather than in the 0.8-1.0 µm range. This is relevant for 5-25 µm spectroscopy because a larger selection of upconversion crystals can then be used; many relevant mid-IR upconversion crystals have a high absorption loss in the 1 µm range, but significantly better transmission characteristics at longer wavelengths (e.g. 2 µm).

The dynamic range of line detector arrays are larger than those of CCD cameras which is highly relevant for spectroscopy.

The invention will substantially reduce the post processing time since, in most embodiments, 1D rather than 2D signal processing is needed.

A better S/N is expected due to reduced detector noise (coming from the individual detector elements) and more signal on each detector element.

A significant difference between the 2D detector approach and the line-detector approach is that the latter can have better spectral resolution since the grating provide extra resolving power.

It is possible to extract and identify angular overlapping upconverted wavelengths with the grating, thus extending the spectral coverage significantly.

In prior art relating to infrared upconversion spectrometers detecting the ring pattern of the upconverted light on a 2D detector, optimal spectral resolution for the upconversion happens in the case for a large diameter collimated laser beam and a long nonlinear crystal. However, in the upconversion spectrometer of the present invention, the opposite is the case. Here the laser beam will serve the purpose of a virtual slit—hence, better spectral resolution is obtained for a tighter focused laser beam inside a shorter crystal.

Furthermore, in the previously described methods the spectral resolution obtainable is, to at least some extent, decided by the phase-match condition of the non-linear material. Similarly, the spectral bandwidth addressable is related also to the phase-match condition.

In traditional spectrographs or spectrometers, a decisive factor for the obtained spectral resolution is the width of an entrance slit. While a narrow slit increases the resolution, it both limits the bandwidth that can be resolved and reduces the signal strength. The bandwidth problem would traditionally be solved by scanning the slit, but this has the disadvantages that it takes time (single shot spectrum not possible) and that it introduces moving parts.

However, for the upconversion spectrometer of the present invention, the spectral resolution is determined by the effective size of the virtual slit (which relates to the laser beam diameter as described above) and the imaging to the grating (i.e. how much of the grating area is illuminated) and grating periods.

Hence, in the present invention, where a grating sets the spectral resolution, it is advantageous to have broad bandwidth acceptance in the nonlinear material, as that enhances the spectral coverage for the same span of angles. In previous described methods, where the angle specific bandwidth acceptance defined the spectral resolution, broad bandwidth acceptance would limit the spectral resolution, and thus generally not be of interest. The bandwidth acceptance is made broad by proper choice of the nonlinear material and mixing laser wavelength.

One major advantage of the infrared upconversion spectrometer according to the invention is, that the spectral resolution is (to some extent) not set by the length of the nonlinear material through the phase-match condition, but by the size of the virtual slit formed by the overlap of the incoupled infrared light and the laser and by the grating design. It further allows for a broader spectral coverage, as a larger part of the upconverted spectrum can be measured.

Preferably, when imaging the spatial overlap between the laser light and the in-coupled infrared light onto the detector, it is the centre of this overlap in the direction of propagation that is positioned in the object plane of the imaging optics. One exception to this is when the upconverted light is internally reflected inside the nonlinear material, in which case it is preferably an output end of the nonlinear material that is positioned in the object plane.

In the light of the above considerations, it may be preferred that the infrared upconversion spectrometer according to the first aspect is further characterized in that it does not involve an entrance slit to the spectrometer.

The nonlinear crystal is preferably shaped and positioned such that the spatial overlap between the laser light and the in-coupled infrared light inside the nonlinear material is at least 1 mm long, such as at least 2 mm, 5 mm, 7 mm or 10 mm long, or preferably at least 15 mm or 20 mm long in the direction of propagation.

To obtain best performance it may be beneficial to use a strongly focused laser beam in the X-direction, whereas the beam shape and beam quality in the Y-direction is less important.

Thus, in a preferred embodiment, the laser is an asymmetric diode laser with an asymmetric emitter area, preferably a broad area laser (BAL) or a tapered diode laser, and with an aspect ratio of more than 3, such as more than 5 or 10. The fast axis (narrow axis) of the diode laser is preferably arranged perpendicular to the lines on the diffraction grating.

BAL or tapered diodes are usually not applicable for upconversion processes due to the typically strict requirements for mode quality in both directions. In the present invention, due to the use of a grating, the mode quality requirements in the direction of the grating lines can be sacrificed for the compactness and high power at low costs of such diode lasers. The diode laser is preferably focused onto the nonlinear material in a narrow, high beam aligned parallel to the grating lines. The spectral resolution of the upconversion spectrometer will be limited by the spectral bandwidth of the mixing laser.

Since the asymmetric diode laser has good mode quality in the one direction, it can be coupled into a very narrow crystal. The incoupled infrared light and the diode laser light will then experience total internal reflection in the short direction of the crystal and come out of the narrow endfacet. In this embodiment, the end-facet of the crystal will be the effective slit of the spectrometer. In an example, the crystal is an AgGaS2 crystal being 0.1-0.2 mm wide, 5 mm high (i.e. aspect ratio of at least 5/0.2=25) and 10 mm long.

In a further preferred embodiment, the nonlinear material is a nonlinear crystal with a length (z-axis) to thickness (x-axis) ratio of more than 20. This is advantageous since it ensures a long thin crystal in which internal reflections act as a waveguide limiting the size of the virtual slit, which in this case will be the end facet of the crystal.

The narrow-crystal design can be implemented in an intra-cavity setup as long as the crystal width in the narrow direction is wider than the mixing laser beam. The total internal reflection will restrict the upconverted light to be emitted effectively only from the end facet plane. This will remove the angular spreading of the non-collinear generated upconverted signal and allow for improved spectral resolution even with nonlinear crystals longer than 20 mm.

A variation of the narrow-crystal design is the wedged crystal design where the width of the crystal is designed e.g. to follow the divergence of the Gaussian mixing laser beam inside the nonlinear crystal. In this implementation there is a wide input face and a narrow exit face where the beam waist of the mixing laser can be placed at the end of the narrow face.

In another preferred embodiment, the nonlinear material is poled at a two or more different superposed frequencies. Poling the nonlinear material with several superposed frequencies allows for the wavelengths that would otherwise only obtain phase matching at large angles to be upconverted also a small angles—i.e. reduces the need for the angular dependent phase matching in order to obtain a large spectral range in the upconversion. This has the further advantage that the width of the virtual slit will be smaller since the angles of the upconverted light will be smaller. In the alternative, the same effect may be obtained using two nonlinear crystals cut at different angles and bonded together.

The invention may be combined with the multichannel techniques described in WO 2015/003721 to form a multichannel infrared upconversion spectrometer by selecting and mounting the nonlinear material appropriately.

The solution of the present invention has a very large angular acceptance of incoming infrared light. Especially large wavelengths, such as 10+µm, may be upconverted when coming in at angles as large as 55°-60° external to the nonlinear material when using small wavelengths for the mixing laser. This is because the k-vectors of the 10+μm are short in relation to those of a small wavelength mixing laser, hence the angle of the upconverted light internal in the nonlinear material will not diverge more than smaller IR wavelengths at smaller angles. This is advantageous as it increases the bandwidth of the spectrometer as well as the amount of light used in the measurement and thus S/N.

In a preferred embodiment of the infrared upconversion spectrometer, the imaging optics comprises a cylindrical lens or a concave cylindrical mirror for focusing the dispersed upconverted radiation on the detector, and wherein the detector is a 2-dimensional detector.

With astigmatic optics, such as a cylindrical lens placed after the diffraction grating with a symmetry axis thereof aligned e.g. along the X-axis and the lines of the grating, the ring pattern will no longer collapse to a line. Instead, at the detector, the X-axis will depict wavelength and the Y-axis will depict the angular distribution the upconverted light from the nonlinear material, i.e. the resulting image may be recorded by a 2-dimensional detector. The optics for coupling of the mid-infrared light to the non-linear crystal is exchanged with astigmatic optics such that positions in the y-axis are transferred to angles in the nonlinear crystal and further to positions in the y-axis on the detector. Hence, an infrared spectrum is obtained for each position along the y-axis from the input signal.

In a preferred layout of the infrared upconversion spectrometer according to the first aspect, wherein the imaging optics comprises a diverging lens followed by a converging lens for expanding and collimating the upconverted light, respectively; wherein the dispersive element is positioned to receive the collimated upconverted light, and wherein the detector is a line-detector. This is advantageous since the diverging lens and the converging lens allows for a significantly shorter spectrometer.

In yet another embodiment, the infrared upconversion spectrometer further comprises means for preventing the upconverted light having the largest angles in the x-axis direction from being dispersed by the dispersive element. These means may be an aperture or a skimmer arranged before the dispersive element, or the size and position and/or orientation of the dispersive element so that the largest angles in the x-direction misses the dispersive element. This is advantageous since it leads to a smaller virtual slit or aperture and thereby a larger spectral resolution. It may be preferred that at least the outer 5% of the angular range in the x-direction be cut off, such as at least the outer 10%, or preferably the outer 15% or 20%. The more is cut off, the larger the resolution, but the less light is also used thus increasing S/N.

In a second aspect, the invention provides a method for determining a mid-IR spectrum of received infrared light, comprising:

providing an infrared upconversion spectrometer comprising:
   a nonlinear material and first optical element arranged to couple received infrared light into the nonlinear material;
   a laser arranged to couple into the nonlinear material in at least substantially the same direction of propagation as, and in spatial overlap with, in-coupled infrared light;
   wherein the nonlinear material, the first optical element, and the laser are configured for non-collinear phase-matching in-coupled mid-IR light and upconverted light in a second wavelength range to be transmitted by the nonlinear material; and
   a spatially resolved detector with multiple pixels being sensitive to light in the second wavelength range;
receiving infrared light and coupling received infrared light and the laser into the nonlinear material whereby in-coupled infrared light and the laser light generates upconverted light in the second wavelength range via a nonlinear optical process in the nonlinear material, the upconverted light forming a concentric pattern with radii as a function of wavelength;
collimating the upconverted light transmitted by the nonlinear material;
dispersing the collimated light;
focusing dispersed light onto the detector;
wherein a spectral resolution of the spectrometer is determined by the laser, the dispersive element and a virtual slit being a spatial overlap between the laser light and the in-coupled infrared light inside the nonlinear material.

In conclusion, the gist of the invention is the combination of non-collinear phase-matching and imaging of the resulting ring-pattern via a dispersive element. This allows a simple and efficient set-up which can detect a broader spectrum of incoming IR light that prior art spectrometers. In particular, the invention can be used to detect spectra of incoherent IR light.

BRIEF DESCRIPTION OF THE FIGURES

The infrared upconversion spectrometer according to the invention will now be described in more detail with regard to the accompanying figures, wherein same reference numerals are used to designate identical or corresponding features. The figures show one way of implementing the present invention and is not to be construed as being limiting to other possible embodiments falling within the scope of the attached claim set.

DETAILED DESCRIPTION OF AN EMBODIMENT

Figure 1A:
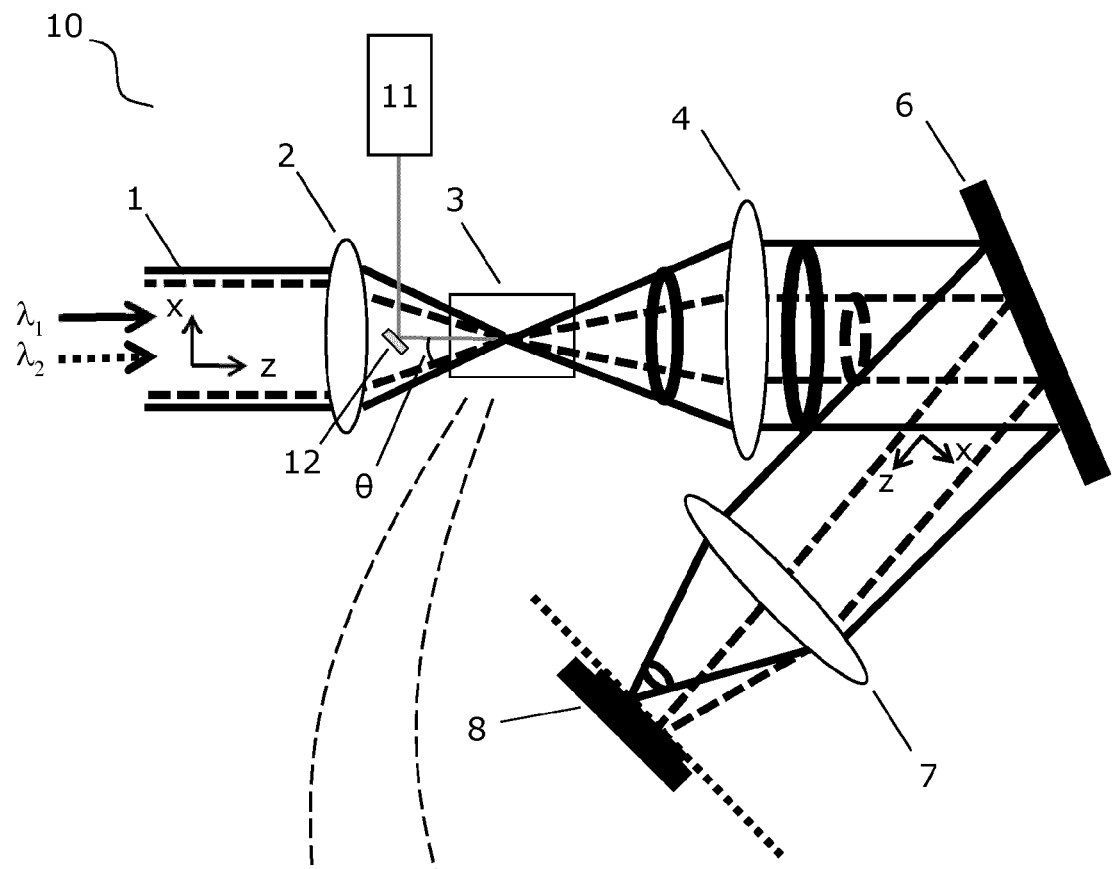
FIG. 1A illustrates an embodiment of the invention, and 1B is a close-up of the nonlinear material.

FIG. 1A illustrates part of an embodiment 10 of the infrared upconversion spectrometer according to the invention used in the following for explanatory purposes. Here, solid and dashed lines represent different wavelengths $\lambda_1$ and $\lambda_2$ of received polychromatic infrared light, and are used to show and explain the different radiation paths for different wavelengths.

Figure 1B:
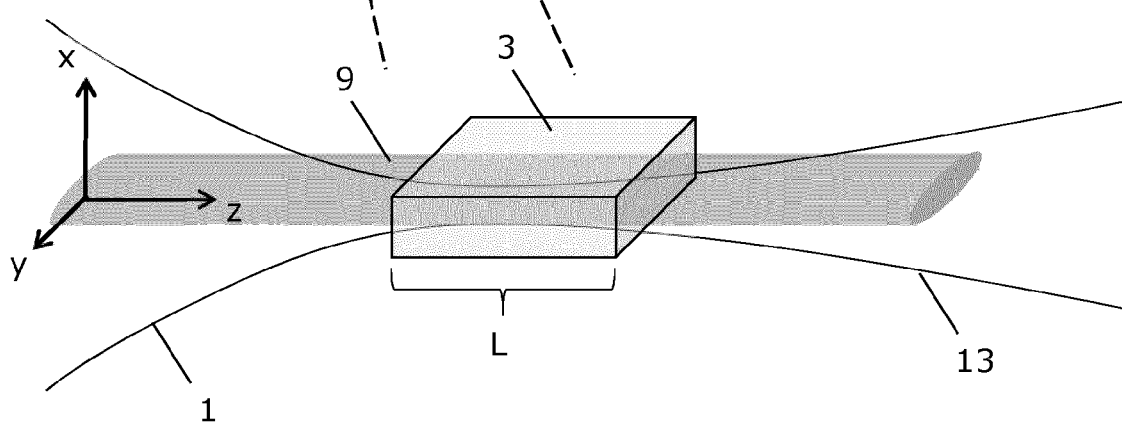

The first optical element for coupling the received infrared light 1 into the nonlinear material 3 is here embodied by a spherical lens 2. Preferred choices for the nonlinear material are various nonlinear crystal, such as periodically-poled Lithium Niobate (PP:LN), aperiodically-poled Lithium Niobate (AP:LN), $AgGaS_2$, $AgGaSe_2$, OP:GaAs, OP:GaN, BNA, and DAST. Inside the nonlinear material, the incoupled light is overlapped with a beam 9 (see FIG. 1B) from a laser 11 coupled in via mirror 12, and with proper orientation or poling of the nonlinear material, a nonlinear optical process such as sum frequency generation (SFG) converts the incoupled light to upconverted light 13 having a shorter wavelength.

The angular dependent (non-collinear) phase-matching relied upon in the present invention means that the phase matching condition will be fulfilled for different angles of incidence, θ, for different wavelengths. Thereby, for say wavelength $\lambda_1$, only light having a large angle of incidence will be phase matched, whereas for $\lambda_2$ ($<\lambda_1$), the phase matching condition will be fulfilled at smaller angles of incidence. Light with wavelength $\lambda_1$ but a small angle of incidence will not fulfil the phase matching condition and will thus not be upconverted. The spatial distribution of the resulting upconverted light will therefore form a concentric pattern with radii as a function of wavelength, i.e. each constituent frequency will emerge with a different angle, similar to dispersion in a prism or a grating.

Adding to this is the conservation of momentum which means that the angle of the generated upconverted non-collinear photons scales with the relative shift in wavelength compared to the incoming mid-IR light. This will narrow the cone of the concentric pattern.

The upconversion process can take place through the entirety of the overlap inside the nonlinear material, here equal to the length L of the nonlinear material. This means that a photon converted near the input can travel along with its new angle as compared to a photon with the same wavelength converted near the exit of the nonlinear material.

The upconverted light 13 is transmitted by the nonlinear material, and the overlap between incoupled light and laser inside the nonlinear material should be imaged onto the detector 8. In the embodiment shown in FIG. 1A, this imaging is performed by imaging optics comprising lenses 4 and 7. In the infinity corrected plane (or Fourier plane) between the lenses, the dispersive element in the form of grating 6 with the grating lines in the Y direction is positioned. The dispersion causes the rings corresponding to different wavelengths to be displaced differently in the X-direction, and the focusing by lens 7 results in a "line of points", each point corresponding to a ring of different wavelength. The referral to rings and points corresponding to a distinct wavelength is used for the purpose of illustration only. Typically, the received infrared light will contain a continuous wavelength spectrum and the "ring pattern" and "line of points" will be continuous features as well.

An example of a line-detector could be e.g. the Xlin detector series from Xenics includes multiplexed InGaAs line arrays with 1024 or 2048 pixels and a 12 μm pitch. The detectors are equipped with one-stage Peltier cooling; three-stage cooling is also available on an optional basis. With the 1024-pixel detector, a line rate of 40 kHz can be achieved; whereas with the 2048-pixel detector, this value is 10 kHz.

The infrared upconversion spectrometer of the invention consists overall of an infrared signal input, represented by a set of mixed wavelengths, an upconversion module that converts the infrared signal to higher energy levels, and a spectroscopic part that disperse the upconverted signal further and measure the specific amount of each spectral component. In the following, a number of different layouts for spectroscopic part will be described in relation to FIGS. 2 through 6. In these Figures, the input set of wavelengths are upconverted into a set of upconverted wavelengths represented by full, dashed and dotted lines respectively. The illustrations track the trajectories of each wavelength.

Figure 2:
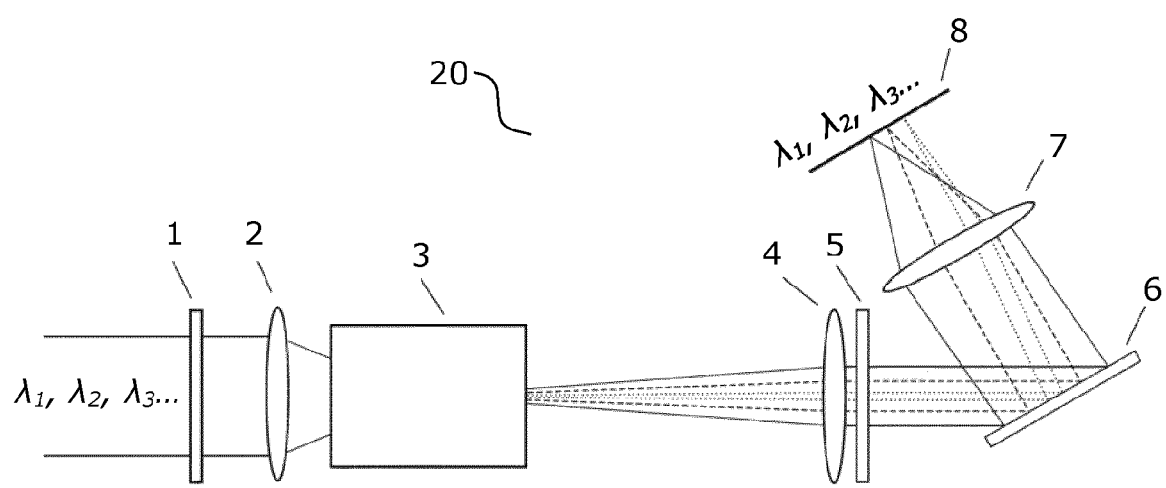
FIGS. 2-6 illustrates different layouts of the spectroscopy part of the spectrometer according to the invention.
Figure 5:
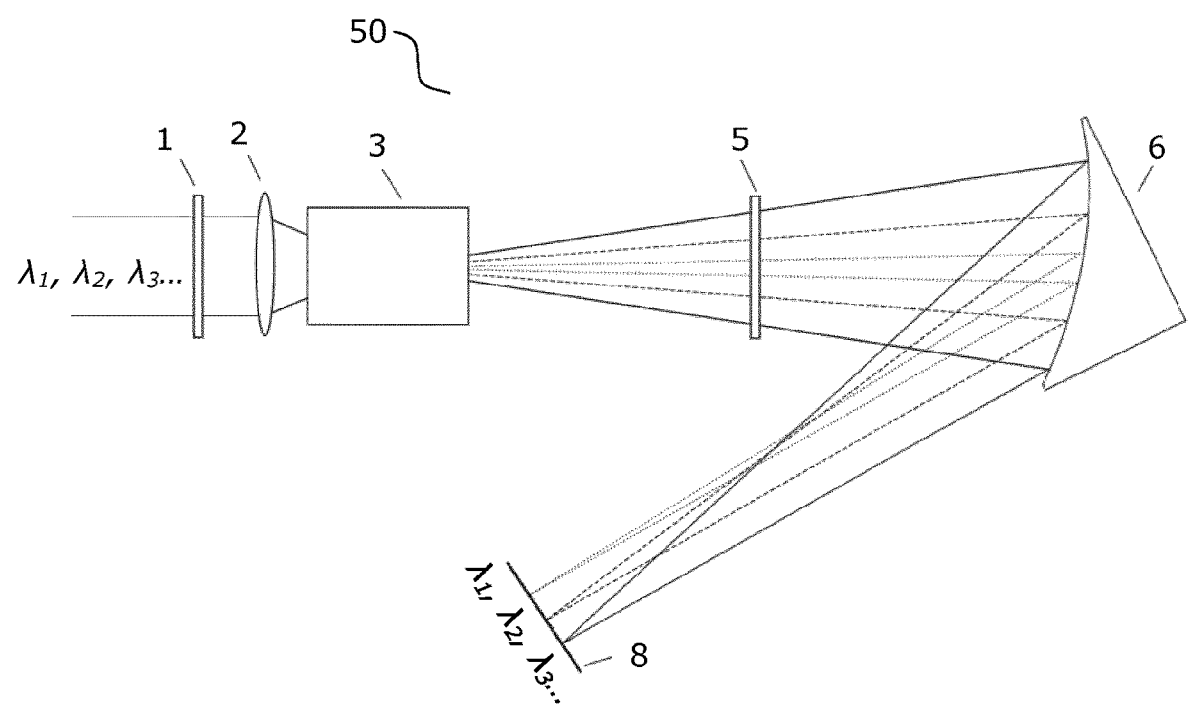

In the layout 20 illustrated in FIGS. 2, 1 and 5 are optional filter elements to separate the signal components from noise and background. 2 is a focusing element to match the incoming infrared signal with the upconversion process in the nonlinear material 3. The upconverted light is collimated by the focusing element 4 and diffracted by the grating 6. The diffracted light is collected by the focusing element 7 and detected by detector 8.

Figure 3:
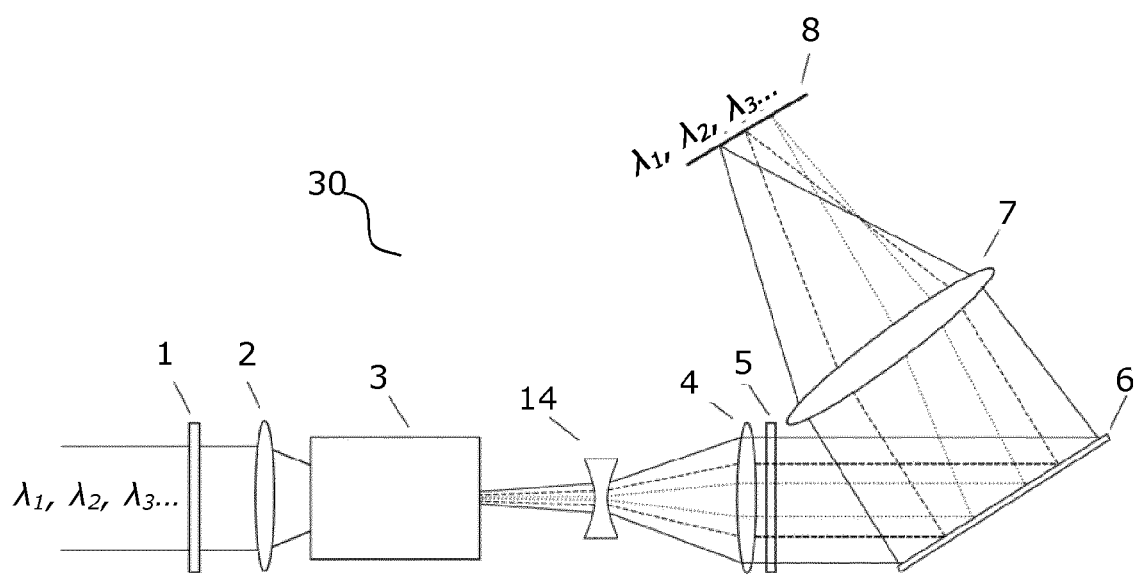
Figure 4:
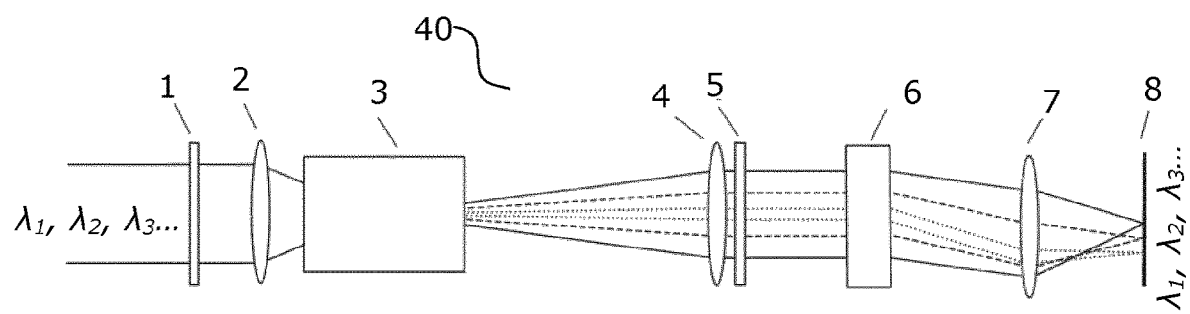

The layout 30 illustrated in FIG. 3 is similar to 20 described above, with a different configuration of the focusing element for the upconverted signal. In this configuration a diverging element, 14, together with a converging element 4, expands and collimate the upconverted signal before it reaches the grating. This results in a more compact construction of the spectrometer The layout 40 illustrated in FIG. 4 is similar to 30 described above, with a general dispersive element, 6. This could be a reflection grating as in 30, or other such as a transmission grating, a prism or a holographic element.

The layout 50 illustrated in FIG. 5 is similar to 20 described above, where the focusing elements for the upconverted signal are included in the dispersive element, 6.

Figure 6:
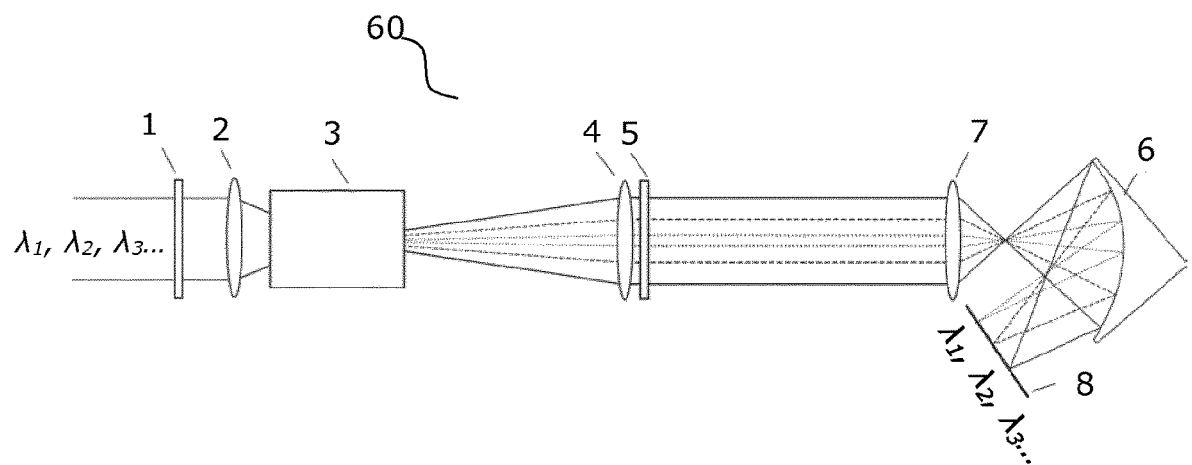

The layout 60 illustrated in FIG. 6 is similar to 50 described above, with a 4f-scaling of the upconverted signal by focusing elements 4 and 7. The dispersive element, 6, includes further a design that allow for optimal flat field detection at detector 8.

In the following, different layouts for intracavity upconversion are described in relation to FIGS. 7 and 8.

Figure 7:
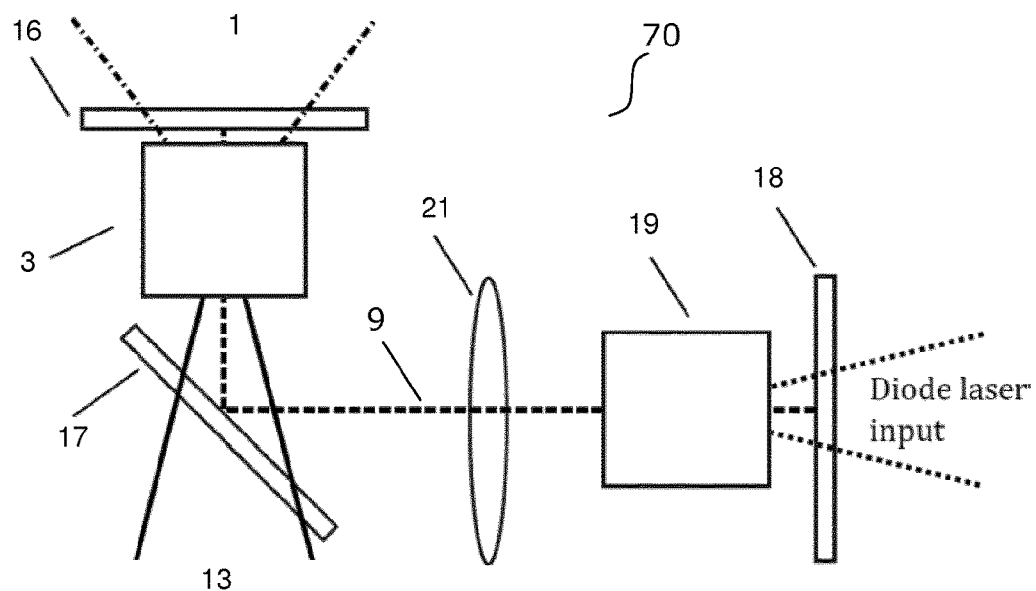
FIGS. 7 and 8 illustrates different layouts of embodiments where the upconversion occurs intracavity in the laser.

FIG. 7 illustrates a layout having three high reflective mirrors, 16, 17, and 18, that together create a laser cavity 70. Inside the laser cavity a gain medium, 19, is placed such that the gain support lasing inside the cavity. The laser crystal 19 is pumped by a diode laser through the dichroic mirror, 18. A focusing element 21 scales the field inside the laser cavity the nonlinear crystal 3 converts the incoming infrared signal to a higher photon energy output through a nonlinear sum frequency process between the intracavity laser field and the incoming infrared light. The infrared light is coupled in through the dichroic mirror 16 and out through the dichroic mirror 17.

Figure 8:
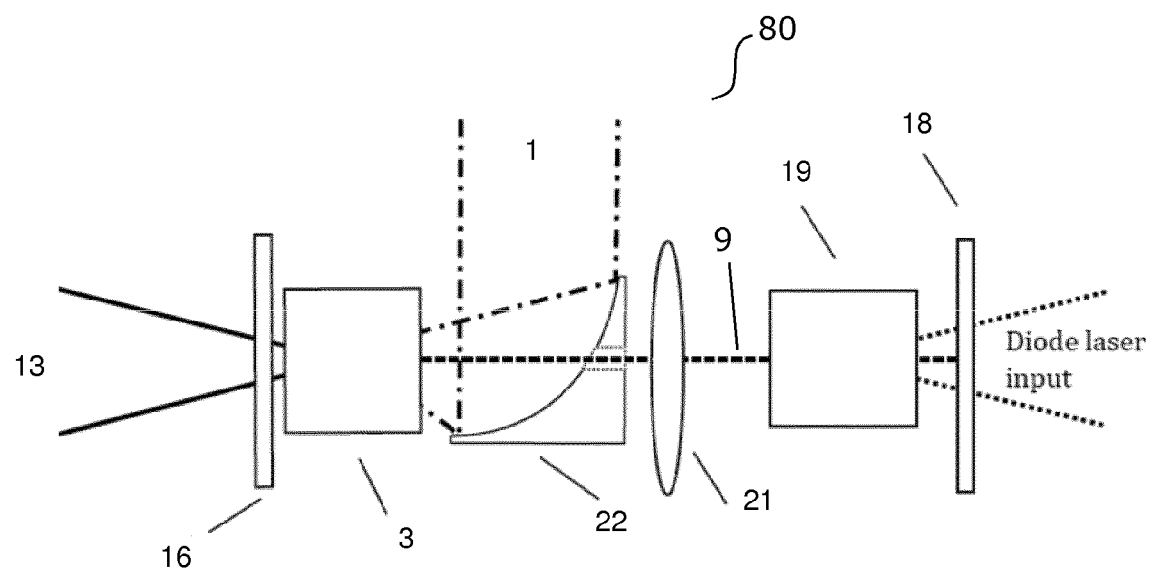

The layout of the laser cavity 80 illustrated in FIG. 8 is similar to 70 described above, but the infrared light is coupled to the crystal with an intracavity parabolic mirror 22, where the laser beam pass through a hole in the parabolic mirror. The upconversion output is done through the dichroic mirror 16.

Figure 9:
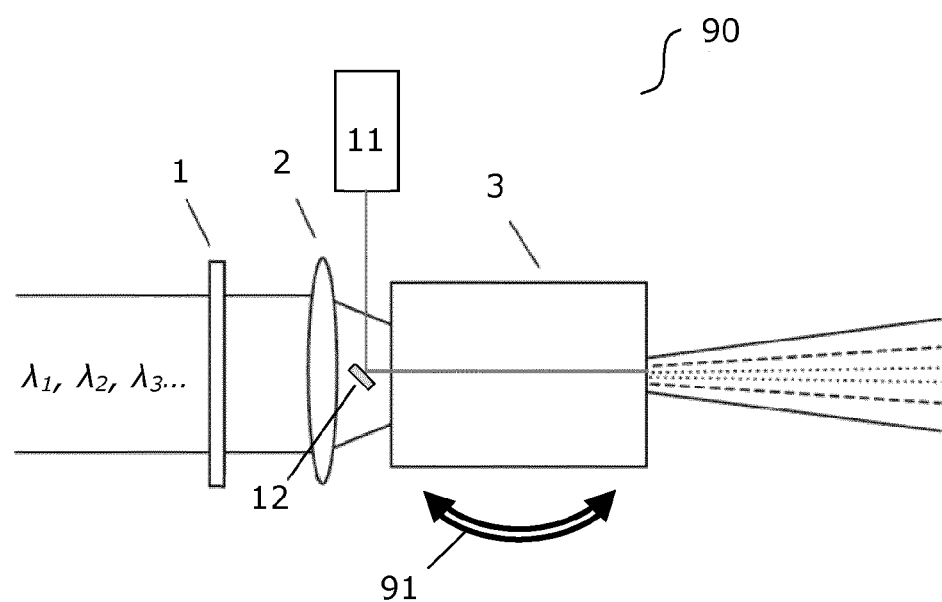
FIGS. 9 and 10 illustrates different embodiments of a multichannel spectrometer according to embodiments of the invention.

FIG. 9 shows an embodiment of a multi-channel infrared upconversion spectrometer 90 using a technique which may be useful in combination with other embodiments of the invention. Herein, an angular dependence of the phase-matching conditions within the nonlinear material 3 is used to form different up-conversion channels. This is achieved by propagating the in-coupled infrared light along multiple paths within the nonlinear material 3. In this way, different spectral ranges of the infrared light are matched by the different phase-matching conditions along the different paths of the in-coupled light. Then, the nonlinear material 3 is rotatably mounted, so that a rotation of the nonlinear material according to arrow 91 directly changes the angle. By rotating the nonlinear material 3 between e.g. two rotational positions, different up-conversion channels may be formed sequentially in time. The number of channels may easily be increased by using more rotational positions. In this embodiment, the demultiplexer is the rotational mount of the nonlinear material 3, which may selectively couple the infrared light into a first up-conversion channel, a second up-conversion channel, and any other up-conversion channels. Detection of light from the respective up-conversion channels may then be performed by time-gated detection while the nonlinear material 3 dwells in the respective rotational position. Thus, light incident on the detector (not shown in this figure) at any given time will only be the up-converted light corresponding to one channel. The skilled person will realize that a continuum of channels may be achieved in this way by scanning the rotational position of the nonlinear material 3.

Figure 10:
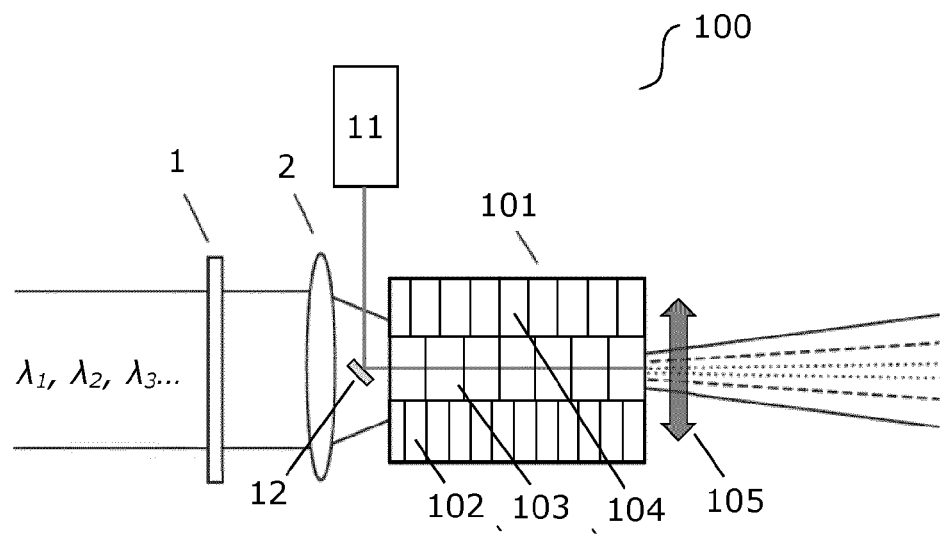

FIG. 10 illustrates another embodiment of a multi-channel infrared upconversion spectrometer 100 that may be useful in combination with embodiments of the infrared spectrometer according to the invention. In this case, the nonlinear material 101 comprises multiple regions (here three are illustrated, in the form of periodically poled regions 102, 103, 104), each having different phase-matching conditions. Each region may correspond to a single up-conversion channel and be selectable by transverse translation of the nonlinear material 101 according to arrow 105. In this way, each channel may be formed one at a time. Thus, the demultiplexer is the translational mount of the nonlinear material 101 in this embodiment.

The following is an example of how to calculate the expected spectral resolution in an infrared upconversion spectrometer according to the invention, and also contains a lot of considerations relating to important design parameters which may be generalized to other embodiments of the invention.

Figure 11A:
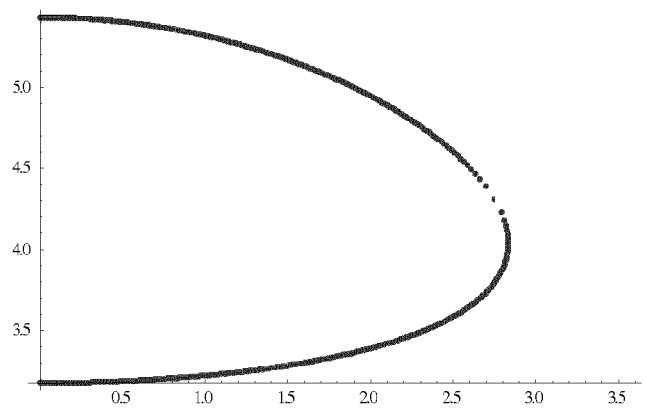
FIGS. 11A and B are calculated curves showing the phase matched upconverted wavelength as a function of angle of the upconverted light relative to the upconversion laser for angles external to the nonlinear material (11A) and angles internal in the nonlinear material (11B).
Figure 11B:
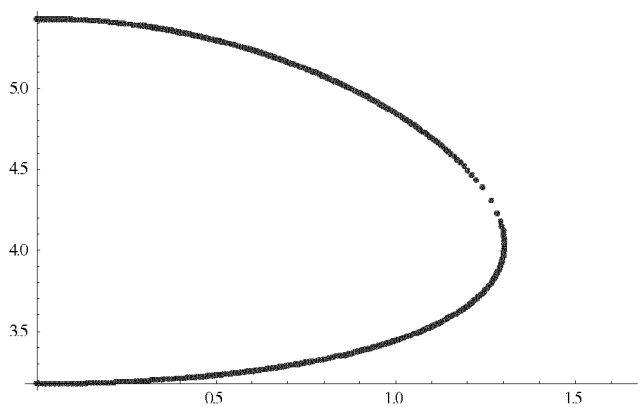

The upconverted wavelength will vary according to phasematch relations. In particular, non-collinear phasematch at varying angles to the laser will lead to different wavelengths being phasematched at different angles. An example calculation of a periodically poled Lithium Niobate crystal gives the relation shown in FIG. 11A expressing the crystal external angles of the upconverted infrared light.

It is important to note that the different output angles corresponds to different input angles as well (conservation of transverse momentum). The above example is performed for PPLN crystal at 60° C. with a poling period of 22 μm, mixing with a 1.064 μm laser source.

We note that most of the wavelength coverage is for angles between 2 and 3 degrees, and remember that it is (almost) rotationally symmetric (neglecting a small variation from change in refractive index).

Virtual Slit Size Estimation

In the following, we do an example calculation on how to determine the effective virtual slit size from theoretical considerations and later how a system can be modified to minimize the virtual slit size. The calculation is based on an example relating to FIGS. 11A, 11B, 12A, 12B and 12C.

Figure 12A:
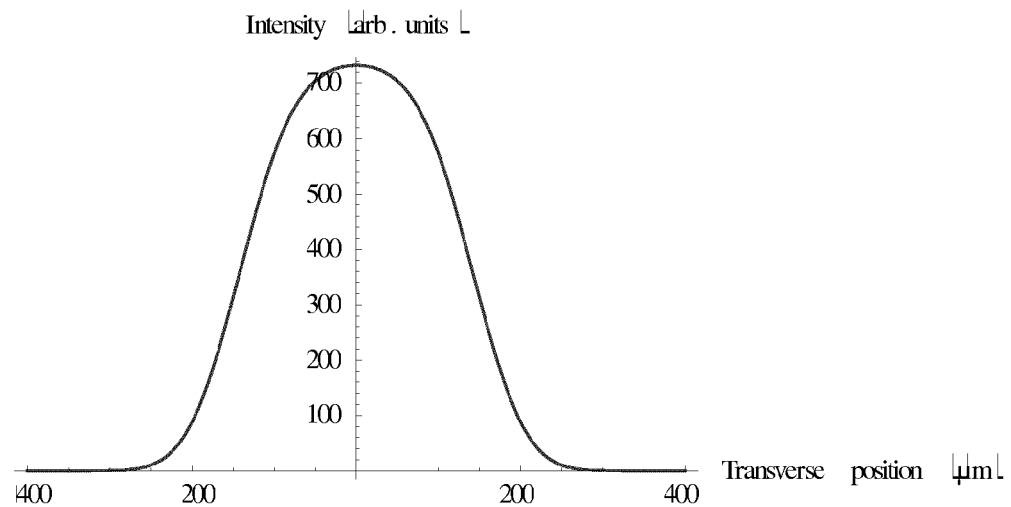
FIGS. 12A and B are plots of the intensity distribution of upconverted light when propagated (back or forth) to the center of the non-linear crystal illustrated in FIG. 12C.
Figure 12B:
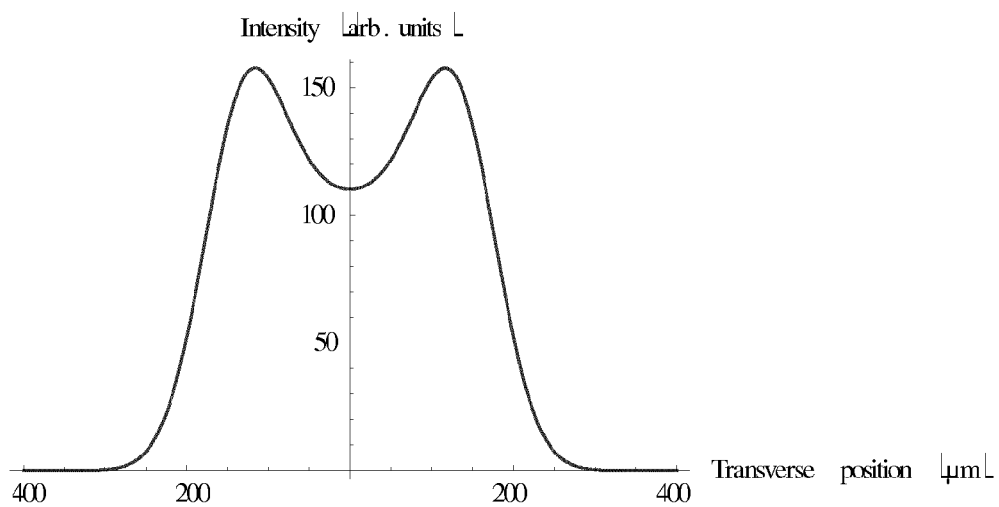
Figure 12C:
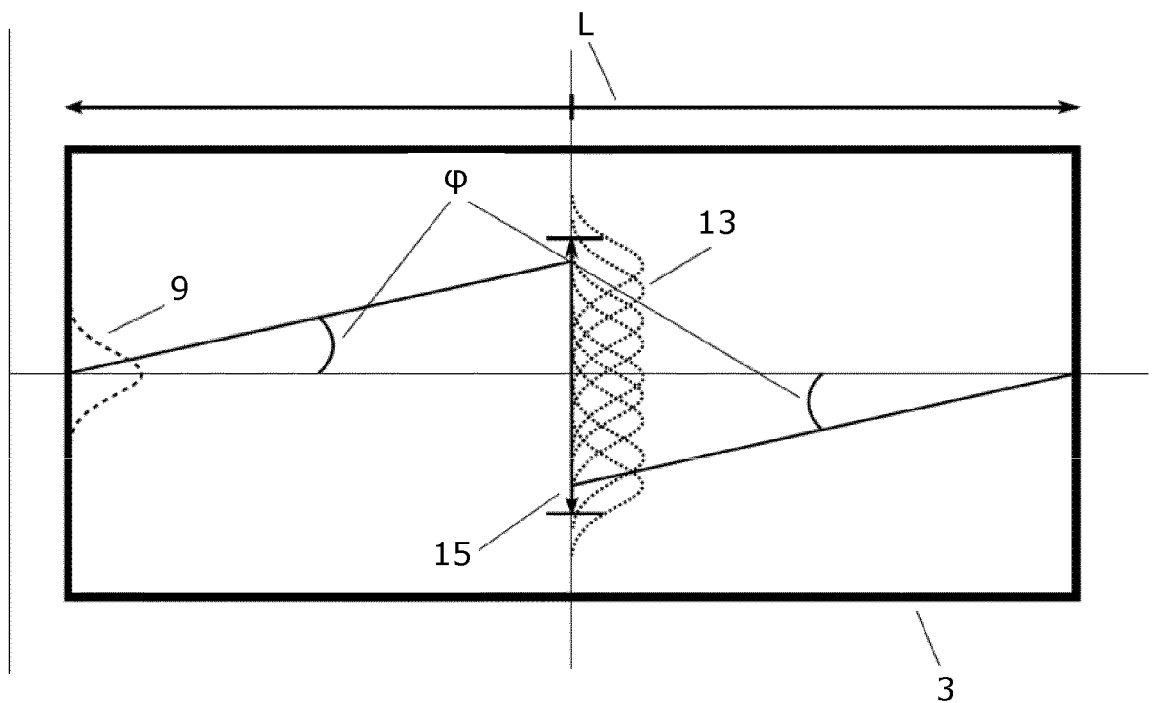

Firstly, FIG. 12C illustrates a nonlinear crystal 3 of length L, in which a mixing laser field 9 and a plane mid-infrared signal are overlapped. The mid-infrared signal is a plane wave extending over the full crystal and is not illustrated here. The virtual slit 15, is computed from the shape of the mixing laser, the incoming field and the collective shape of the upconverted light 13 at a specific angle φ as seen from the center part of the crystal in the z-direction. I.e. a convolution of a top hat and a Gaussian distribution, that is the width of the virtual slit is a combination of the width of the mixing laser and the angular spread of the upconverted signal in the x-direction.

The angle φ of the upconverted light inside the crystal plays a crucial role in determining the virtual slit size in the crystal. In the photon efficiency calculation we assume that the infrared light being upconverted is incoherent light coming from e.g. a large thermal source such as a hot filament, which is able to fill the non-linear crystal with infrared light from all angles in the entire volume of the laser. Since the angles of the infrared light are quite large, it is common to have total internal reflections on the facets in the x and/or y directions. This helps significantly in filling the whole length of the crystal with infrared light.

An external angle at around 2 degrees correspond to an internal crystal angle of about 1 degree (since the refractive index of PPLN is about 2). An accurate calculation gives the curves in FIGS. 11A and B showing the phase matched upconverted wavelength as a function of angle of the upconverted light relative to the upconversion laser for angles external to the nonlinear material (11A) and angles internal in the nonlinear material (11B).

The calculation is performed for a PPLN crystal with a poling period of 22 μm and a temperature of 60° C. The plot shows the angle of optimal conversion efficiency, although each wavelength will be upconverted in a range of angles near this maximum. The angles external to the crystal (11A) are relevant for designing size and focal length of lenses/mirrors and gratings. The internal crystal angle (11B) plays an important role in determining the size of the "virtual slit" in the center of the crystal.

In this example we assume a crystal length of 20 mm. Light generated in the beginning of the crystal at an angle of 1 degree will move sideways to the center of the crystal with: 10 mm*Tan(1°)=174 μm. If we for example have a radius of the laser of 90 μm, we will then achieve an effective slit width dominated by the sideways translation of the upconverted light. However, to the untrained eye, this relation may seem trivial, but there are complexities arising from phase match conditions. If we consider the exactly phase matched process, the field generated in the beginning of the crystal will be in phase with the field generated everywhere else in the crystal. However, much of the contribution of upconverted light is for non-perfect phasematching. This means that the field in the virtual slit will add with different phase, dependent on how far it has been (back or forth) propagated within the crystal. This will lead to non-trivial virtual field distribution in the center of the crystal (virtual since some of the field hasn't been generated yet, and only exists in the center of the crystal as a mathematical abstraction).

The virtual field (converted to intensity) can look like the profiles shown in FIGS. 12A and B for a phasematched (12A) and somewhat non-phasematched (12B) case ($\Delta k^*L=7.6$), for a laser with $w_0=90$ μm.

Here, a single wavelength is modelled as a plane wave coming from a single non-collinear angle that may be phase matched (FIG. 12A), or not perfectly phase matched (12B). The plots show example calculation for a laser spot radius of 90 μm, and an internal angle of 1°, a crystal length of 20 mm. The longer the upconverted crystal is, and the larger the internal angle of propagation is, the larger the virtual slit will appear to be. It is important to note that only the field propagated forward to the center of the crystal has a physical presence in the virtual slit, as opposed to the field generated by SFG later in the crystal. When calculating the total virtual slit size for a given wavelength, the intensity for all angles and corresponding phase match conditions should be added. If the IR source is incoherent, such as light from a hot filament, it is the intensities that should be added. If the IR source is a spatially coherent source, the fields should be added before calculating the generated field. FIG. 12A, is calculated as the convolution of a tophat function and a Gaussian function, whereas FIG. 12B is the same convolution but added with different phase contribution depending on the z-coordinate from which it stems, as outlined in FIG. 12C. The tophat function originates from the fact that the light is generated at different angles and z-positions in the crystal and the Gaussian distribution is the product of the incoming plane infrared wave and the mixing laser.

The total amount of light is an integration of all the individual intensity distribution over all incident angles with correspondingly varying phasematch condition. This integration should be done separate for each wavelength under consideration.

When all these intensity distributions are added together for a given wavelength, it is seen that for the example case we have an effective slit radius of about 200 μm.

Note that the effective slit width is reduced considerably by using a shorter crystal. E.g. the sideways translation will be halved by using a half as long crystal. However, using a shorter crystal is detrimental to the amount of photons being upconverted. The expert in the field will know that for large beam diameters and collinear mixing the quantum efficiency will generally decrease by the crystal length squared. For the non-collinear case with angles larger than $w_0/L$, the situation is quite different and a detailed analysis reveals that for the case of thermal light upconversion half as long crystal leads only to half as many upconverted photons, where the significant decrease in quantum efficiency is partly alleviated by a corresponding increase in angular acceptance. Surprisingly, this holds true for even very large incidence angles of infrared light to a narrow laser beam in a relatively long crystal.

Now, to calculate the spectral resolution achievable in a setup like the one illustrated in FIG. 2, where we use an f=200 mm as the first lens after the crystal and the grating is tilted 60° relative to the z-axis. the radius of the illuminated area on the grating will be: 200 mm*sin(2.9°)/cos(60°)=20 mm. Hence, it will fit nicely within a 50 mm grating (although the grating needs only be 20 mm high).

For optimal resolution, it is better to use a grating with more lines per mm (up to a point). For this calculation we consider a blazed grating with 1200 lines/mm using the first order diffraction. The blazed grating is particular efficient in making sure that most of the light is generated in the desired spectral order, and are available at low cost from many different vendors.

The equation for diffraction on a grating can be expressed as:

$$a[\sin \theta_m + \sin \theta_i] = m\lambda$$

Where a is the grating constant (1/a=grating lines/mm), m is the diffraction order, λ is the wavelength of the light after upconversion and $\theta_m$ and $\theta_i$ are the output and incidence angles to the grating respectively.

The grating with 1200 lines/mm has a wavelength dispersion of around 0.74 nm/mrad. The light we send to the grating appears to come from an area of up to 400 μm in diameter (the effective slit width), giving an uncertainty of the angle that is hitting the grating of 400 μm/200 mm=2 mrad (i.e. +/−1 mrad). This uncertainty in angle of incident light is a fundamental limiting factor of how the achievable resolution in the spectrometer.

Let's assume we intend to image the whole upconverted spectrum in the above example from 3.2 μm to 5.5 μm, corresponding to 798 nm to 891 nm in upconverted wavelengths. These wavelengths will be distributed by the grating between $\theta_m(798 \text{ nm})=0.0917$ rad to $\theta_m(891 \text{ nm})=0.2046$ rad. It can be shown that the uncertainty in the angle in $\theta_i$ scales with $\cos(\theta_i)/\cos(\theta_m)$ to $\theta_m$, and hence the uncertainty on $\theta_m$ in this case is about half of what it is in $\theta_i$. Hence $\theta_m$ uncertainty is about +/−0.5 mrad. The bandwidth (891 nm−798 nm=93 nm) is distributed over 0.2046 rad−0.0917 rad=0.1129 rad. With an uncertainty of em of +/−0.0005 rad, this gives a resolution on the upconverted side of 93 nm*0.0005 rad/0.1129 rad=+/−0.4 nm.+/−0.4 nm uncertainty on the upconverted wavelength corresponds to a quite different uncertainty (or rather resolution) for the infrared light. From energy conservation we have:

$$\frac{1}{\lambda_{up}} = \frac{1}{\lambda_{laser}} + \frac{1}{\lambda_{IR}}$$

Which by differentiation leads us to the bandwidth in upconverted wavelength $\Delta\lambda_{up}$ corresponds to a bandwidth much larger at the infrared wavelength $\Delta\lambda_{IR}$:

$$\Delta\lambda_{IR} = \left(\frac{\lambda_{IR}}{\lambda_{up}}\right)^2 \Delta\lambda_{up}$$

Hence, if the laser is 1064 nm, and the IR wavelength is 3500 nm, then $\lambda_{up}$ is 816 nm. This scales the +/−0.4 nm @ 816 nm to +/−7.4 nm @ 3500 nm. Sometimes it is easier to consider bandwidth in units that are energy-equivalent such as MHz or $cm^{-1}$, where the bandwidth is conserved in the wavelength transformation process (fact of energy conservation).

Now, to image the light diffracted from the grating to a detector we need an optical component such as a lens. The lens should be at a position to catch all the light diffracted in the desired order by the grating, and focus it to a line on the detector. In this case, the detector should be placed in the focal plane of the lens, since it should convert the spectral information contained in the angles of the light to positions on the detector. If we want to distribute the light over e.g. 2000 pixels of 14 μm width, we can choose a lens with focal length of 2000*14 μm/0.1129 rad=248 mm. So a lens with a focal length of 200 mm would be a reasonable choice to image the light to the line-detector. The uncertainty in output angles of +/−0.5 mrad through a 200 mm lens, corresponds to position uncertainty on the camera of 0.5 mrad*200 mm=+/−100 μm. This is well larger than the pixel size of the example line-detector, so one might design the system with a shorter focal length without significant decrease in spectral resolution.

One solution to achieve better spectral resolution is to avoid using the larger upconverted angles in the plane where the grating is active. One simple solution for this purpose is to use a 25 mm grating in the above described setup. The 25 mm grating is high enough to capture all the light in the vertical direction, but since it is tilted 60 degrees it is not wide enough to capture the light at large angles in the horizontal plane. In the example above a 25 mm grating would limit the horizontal angles to about 25 mm/2*Cos (60°)/200 mm=31.25 mrad=1.8°. This would limit the largest horizontal angle to be 1.8 degree rather than 2.9 degree (external angle). Again this would limit the width of the apparent horizontal aperture to be a factor 1.8/2.9 times smaller, i.e. 174 μm*1.8/2.9=108 μm, thus leading to significant improvement in the spectral resolution, at the cost of lower signal at the wavelengths phase matched above 1.8 degree in FIG. 9A. It is important to realize that the broadening of the virtual slit from the incident angles is relevant only for the angle projected to the x-axis. In particular, upconverted light with only an angle in the y-direction will not give rise to transverse broadening of the effective slit width. Hence, by making sure that preventing light upconverted at larger angles in the x-direction from reaching the dispersive element, we thus limit the virtual slit dimension and hence improve the spectral resolution obtained, at the cost of some degradation of the signal for the wavelengths cut off.

Figure 13A:
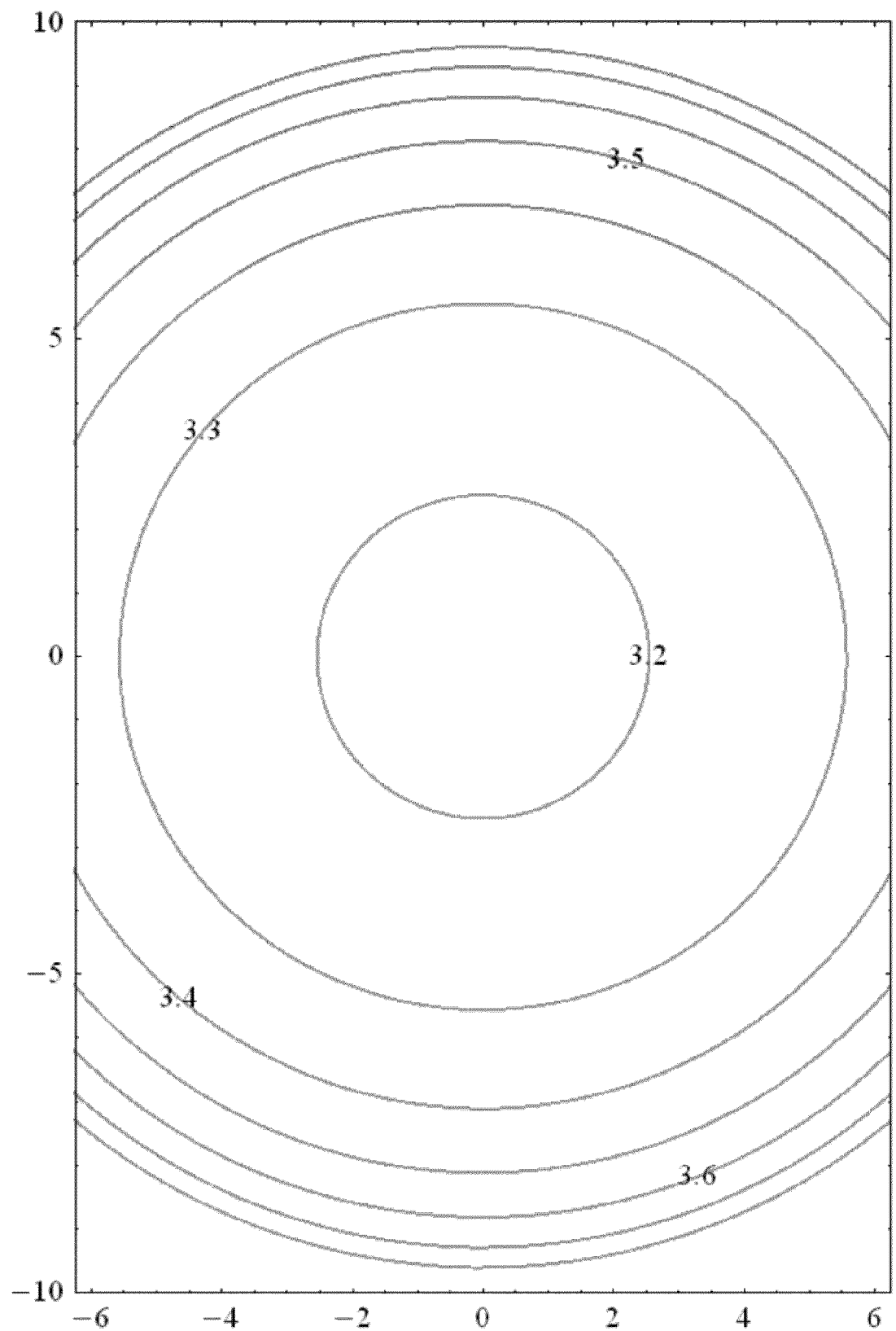
FIGS. 13A-C are contour plots showing the phase match curves as they can appear in the plane of the grating. The grating considered here is a 25 mm grating placed at an angle of 60° to the Z-axis. In this example the grating acts as a spatial aperture removing larger angles in the x-direction, whereas larger angles in the y-direction
Figure 13B:
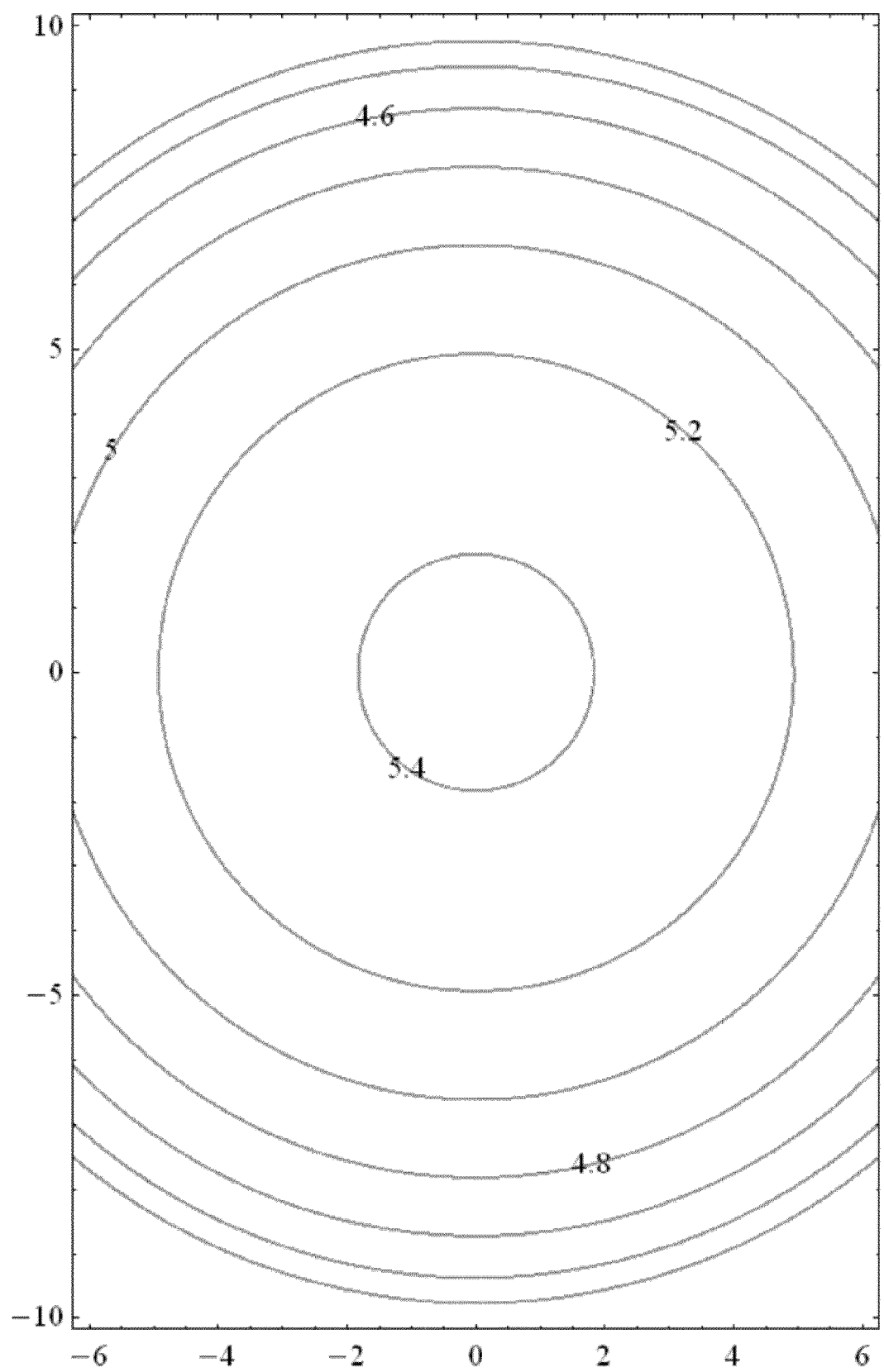
Figure 13C:
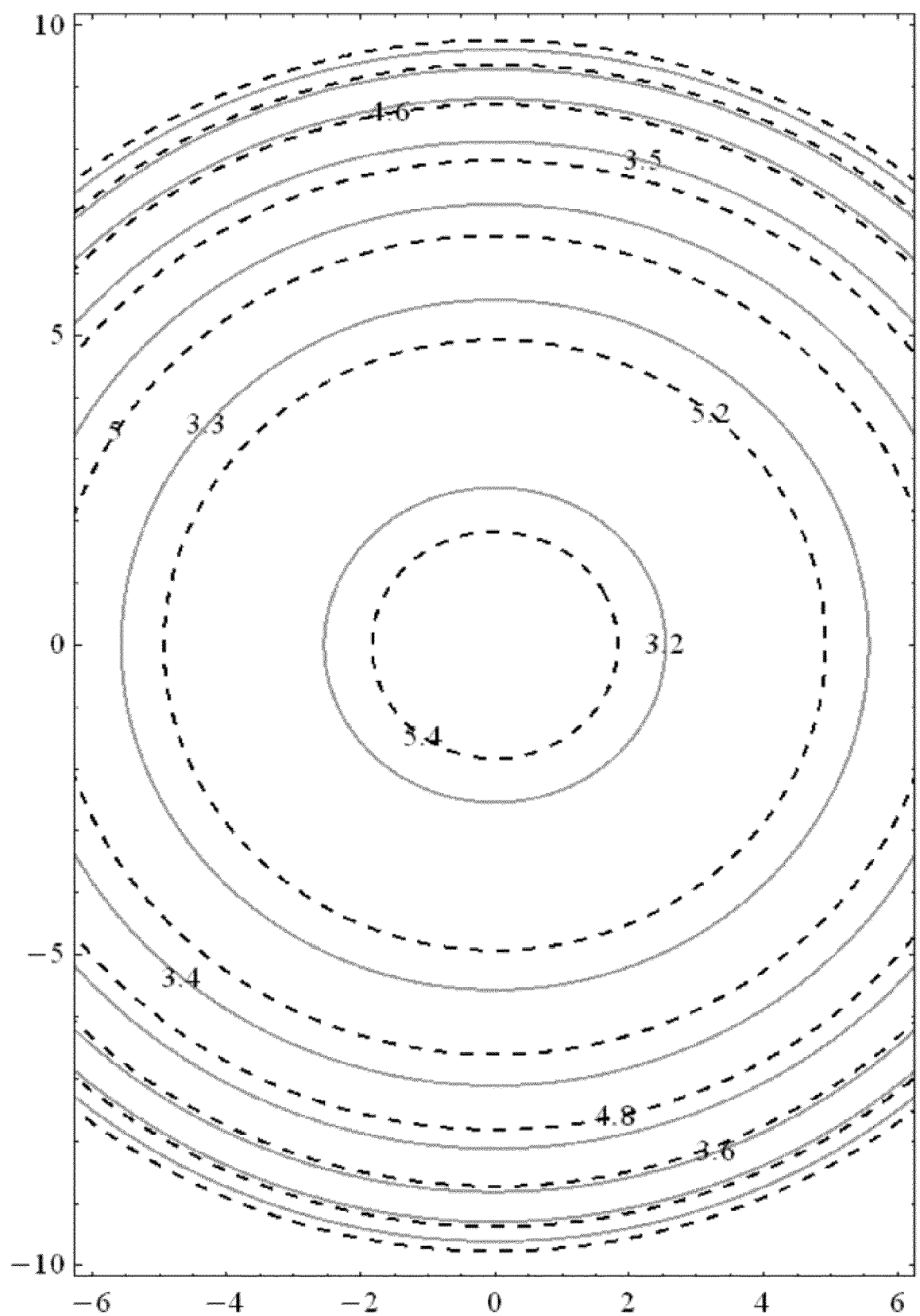

The effect of the grating acting as an angle limiter, would remove some of the upconverted light. To be more precise, the horizontal edges of the phase match curve would be removed. as indicated in the contour plots shown in FIGS. 13A-C. Contour plot 13A and 13B shows the lower and upper half of the phasematch curve in FIG. 11A, as it would appear on a grating that is intentionally too narrow to accept the full circular pattern. FIG. 13C shows the combination of FIGS. 13A and 13B. In fact, a 25×25 mm grating tilted 60° relative to the z-axis, has an apparent size of 12.5×25 mm when viewed along the z-axis.

The invention claimed is:

1. An infrared upconversion spectrometer for determining a mid-IR spectrum of received infrared light, wherein the spectrometer comprises:
   a nonlinear material and first optical element configured to couple the received infrared light into the nonlinear material;
   a laser configured to couple into the nonlinear material in at least substantially the same direction of propagation as, and in spatial overlap with, in-coupled infrared light;
   where the nonlinear material, the first optical element, and the laser are configured for non-collinear phase-matching in-coupled mid-IR light and upconverted light to be transmitted by the nonlinear material; and
   a spatially resolved detector with multiple pixels being sensitive to upconverted light;
   the infrared upconversion spectrometer further comprising:
   imaging optics arranged between the nonlinear material and the detector to image the spatial overlap between the laser light and the in-coupled infrared light inside the nonlinear material onto the detector; and
   a dispersive element configured to disperse upconverted light so that different wavelength sub-ranges of the upconverted light are imaged onto different pixels of the detector;
   and in that a spectral resolution of the spectrometer is determined by the laser, the dispersive element and a virtual slit being a spatial overlap between the laser light and the in-coupled infrared light inside the nonlinear material.

2. The infrared upconversion spectrometer according to claim 1, wherein the spatial overlap between the laser light and the in-coupled infrared light inside the nonlinear material is at least 1 mm long in the direction of propagation.

3. The infrared upconversion spectrometer according to claim 1, wherein the imaging optics comprises a diverging lens followed by a converging lens for expanding and collimating the upconverted light, respectively; wherein the dispersive element is positioned to receive the collimated upconverted light, and wherein the detector is a line-detector.

4. The infrared upconversion spectrometer according to claim 1, wherein the imaging optics comprises a cylindrical lens or a concave cylindrical mirror for focusing the dispersed upconverted radiation on the detector, and wherein the detector is a 2-dimensinal detector.

5. The infrared upconversion spectrometer according to claim 1, wherein the laser is an asymmetric laser field having an asymmetric emitter area with an aspect ratio of more than 3.

6. The infrared upconversion spectrometer according to claim 5, wherein the nonlinear material is a nonlinear crystal with a length (z-axis) to thickness (x-axis) ratio of more than 20.

7. The infrared upconversion spectrometer according to claim 1, wherein the nonlinear material is poled at a two different superposed frequencies.

8. The infrared upconversion spectrometer according to claim 1, further comprising a means for preventing the upconverted light having the largest angles in the x-axis direction from being dispersed by the dispersive element.

9. A method for determining a mid-IR spectrum of received infrared light, comprising:
   providing an infrared upconversion spectrometer comprising:
      a nonlinear material and first optical element configured to couple received infrared light into the nonlinear material;
      a laser configured to couple into the nonlinear material in at least substantially the same direction of propagation as, and in spatial overlap with, in-coupled infrared light;
   wherein the nonlinear material, the first optical element, and the laser are configured for non-collinear phase-matching in-coupled mid-IR light and upconverted light to be transmitted by the nonlinear material; and
   a spatially resolved detector with multiple pixels being sensitive to upconverted light;
   receiving infrared light and coupling received infrared light and the laser into the nonlinear material whereby in-coupled infrared light and the laser light generates upconverted light via a nonlinear optical process in the nonlinear material, the upconverted light forming a concentric pattern with radii as a function of wavelength;
   collimating the upconverted light transmitted by the nonlinear material;
   dispersing the collimated light; and
   focusing dispersed light onto the detector;
   wherein a spectral resolution of the spectrometer is determined by the laser, the dispersive element and a virtual slit being a spatial overlap between the laser light and the in-coupled infrared light inside the nonlinear material.

* * * * *